United States Patent
Barber et al.

(10) Patent No.: US 9,444,773 B2
(45) Date of Patent: Sep. 13, 2016

(54) AUTOMATIC TRANSLATOR IDENTIFICATION

(71) Applicant: Mimecast North America Inc., Waltham, MA (US)

(72) Inventors: Mark Barber, Essex (GB); Nathaniel S. Borenstein, Greenbush, MI (US)

(73) Assignee: Mimecast North America, Inc., Waltham, MA (US)

(*) Notice: Subject to any disclaimer, the term of this patent is extended or adjusted under 35 U.S.C. 154(b) by 0 days.

(21) Appl. No.: 14/447,683

(22) Filed: Jul. 31, 2014

(65) Prior Publication Data

US 2016/0036740 A1    Feb. 4, 2016

(51) Int. Cl.
*H04L 12/58*   (2006.01)
*G06F 17/28*   (2006.01)
*G06F 21/00*   (2013.01)
*G06Q 10/06*   (2012.01)

(52) U.S. Cl.
CPC .......... *H04L 51/063* (2013.01); *G06F 17/289* (2013.01); *G06F 21/00* (2013.01); *G06Q 10/063112* (2013.01); *H04L 51/08* (2013.01)

(58) Field of Classification Search
CPC .............. H04L 51/063; H04L 51/08
USPC ........ 704/1–10, 237–240, 246, 247
See application file for complete search history.

(56) References Cited

U.S. PATENT DOCUMENTS

| | | | |
|---|---|---|---|
| 2013/0006602 A1* | 1/2013 | Zhu ............ | G06F 17/289 704/2 |
| 2013/0144595 A1* | 6/2013 | Lord ........... | G06F 17/289 704/2 |
| 2014/0303956 A1* | 10/2014 | Wilson ......... | G06Q 10/06 704/2 |

FOREIGN PATENT DOCUMENTS

| EP | 1 533 736 | 5/2005 |
|---|---|---|
| EP | 2 485 181 | 8/2012 |
| WO | WO 2009/036114 | 3/2009 |

OTHER PUBLICATIONS

International Search Report and Written Opinion for App. Ser. No. PCT/US2015/039872, dated Oct. 9, 2015.

* cited by examiner

*Primary Examiner* — Marcellus Augustin
(74) *Attorney, Agent, or Firm* — Brown Rudnick LLP; Mark S. Leonardo

(57) ABSTRACT

The technology described in this document can be embodied in a method that includes receiving information via a user interface provided on a display of a user device from a first user associated with a pre-determined user group. The information includes an identification of a) a source language and b) a target language to which translation from the source language is requested. The method also includes determining that one or more second users of the pre-determined user group is associated with the source language and associated with the target language. This can be determined based on accessing a data repository that stores language capabilities of users within the pre-determined user group, wherein the language capabilities are determined automatically based on mining a corpus of electronic documents associated with the pre-determined user group. An identification of the one or more second users can be displayed on the user interface.

45 Claims, 6 Drawing Sheets

AUTOMATIC TRANSLATOR IDENTIFICATION

TECHNICAL FIELD

This document describes technology related to automatically identifying translators for electronic communications.

BACKGROUND

Email systems often allow users to exchange email messages in different languages and scripts. A user of an email system may use more than one language or script.

SUMMARY

In a general aspect 1, a computer-implemented method for identifying candidate translation capabilities comprises: transmitting, from a client device to a remote server, a request for a translation of the content from a source language to a target language, the request identifying the source language and the target language; identifying, by the remote server and based on the request, one or more candidate users that are likely to be able to translate the content from the source language to the target language, based on electronic communications or electronic documents associated with the one or more candidate users; and providing, by the remote server, contact information of the one or more candidate users to the client device.

In a general aspect 2, a computer storage medium storing computer-readable instructions, which when executed by one or more computers, cause the one or more computers to perform operations, the operations comprising: receiving, by a server and from a client device, a request for a translation of content from a source language to a target language, the request identifying the source language and the target language; identifying, by the server and based on the request, one or more candidate users that are likely to be able to translate the content from the source language to the target language, based on electronic communications or electronic documents associated with the one or more candidate users; and providing, by the server, contact information of the one or more candidate users to the client device.

In a general aspect 3, a client device comprises: one or more processors; and a processor-readable medium coupled to the one or more processors having instructions stored thereon which, when executed by the one or more processors, cause the one or more processors to perform operations for identifying candidate translation capabilities, the operations comprising: transmitting, from the client device to a remote server, a request for a translation of content from a source language to a target language, the request identifying the source language and the target language; and receiving contact information of one or more candidate users from the remote server, wherein the one or more candidate users were identified to likely be able to translate the content from the source language to the target language, based on electronic communications or electronic documents associated with the one or more candidate users.

In a general aspect 4, a computer system comprises: a database storing electronic communications or electronic documents associated with multiple users; an analysis engine configured to: receive, from a client device, a request for a translation of content from a source language to a target language; identify, by the analysis engine and based on the request, one or more candidate users from the multiple users, wherein the one or more candidate users are likely be able to translate the content from the source language to the target language, based on electronic communications or electronic documents associated with the one or more candidate users; and a communication engine configured to provide contact information of the one or more candidate users to the client device.

In aspect 5 according to aspect 4, the database is configured to receive a change to the electronic communications, to the electronic documents, or to the associated multiple users; the analysis engine is further configured to: updating, upon the receiving of the change, the one or more candidate users that are likely be able to translate the content from the source language to the target language; and the communication engine is further configured to provide contact information of the updated one or more candidate users to the client device.

In aspect 6 according to any one of aspects 1 to 5, the identifying of the one or more candidate users that are likely to be able to translate the content from the source language to the target language comprises: analyzing content of the electronic communications or the electronic documents associated with the one or more candidate users; and determining that the electronic communications or electronic documents associated with the one or more candidate users include an amount or fraction or percentage of content in the source language and in the target language above a predetermined threshold or rate.

In aspect 7 according to aspect 6, the analyzing of content of the electronic communications or the electronic documents associated with the one or more candidate users comprises: mining at least one of emails, phone calls, blog entries, voice recordings, text files, graphic files, videos, or images associated with the one or more candidate users.

In aspect 8 according to any one of aspects 6 to 7, the determining that the electronic communications or electronic documents associated with the one or more candidate users include an amount of content in the source language and in the target language above a predetermined threshold includes: using a look-up table storing frequently used words or language-specific characters to distinguish between different languages.

In aspect 9 according to any one of aspects 6 to 8, the client device receives, prior to the transmitting, an electronic communication or an electronic document containing the content in the source language.

In aspect 10 according to any one of aspects 6 to 9, the determining that the electronic communications or electronic documents associated with the one or more candidate users include an amount of content in the source language and in the target language above a predetermined threshold includes: determining a compressibility of written text and comparing the determined compressibility with known values to distinguish between different languages.

In aspect 11 according to any one of aspects 6 to 10, the determining that the electronic communications or electronic documents associated with the one or more candidate users include an amount of content in the source language and in the target language above a predetermined threshold includes: extracting features from the electronic communications or the electronic documents during run-time, and identifying or distinguishing between languages based on the extracted features and by using a machine learning algorithm that was trained on training data for multiple languages.

In aspect 12 according to any one of aspects 1 to 11, receiving of the electronic communication or the electronic document containing content in a source language includes:

while the electronic communication or the electronic document is being composed in a user interface provided by the client device: identifying, by the client device, the source language; and transmitting, from the client device to a remote server, the request for the translation of the content to the target language, the request identifying the identified source language and the target language.

In aspect 13 according to any one of aspects 1 to 12, the receiving of the electronic communication or the electronic document containing content in a source language includes: while the electronic communication or the electronic document is being composed in a user interface provided by the client device: identifying, by the client device, the source language by extracting features from the electronic communications or the electronic documents during run-time, and identifying or distinguishing between languages based on the extracted features and by using a machine learning algorithm that was trained on training data for multiple languages; and transmitting, from the client device to a remote server, the request for the translation of the content to the target language, the request identifying the identified source language and the target language.

In aspect 14 according to any one of aspects 1 to 13, the providing of the contact information of the one or more candidate users to the client device includes: automatically establishing an electronic communication channel between the client device and the identified one or more candidate users.

In aspect 15 according to any one of aspects 1 to 14, the identifying of the one or more candidate users that are likely to be able to translate the content from the source language to the target language comprises: comparing vocabulary used by the one or more candidate users to words stored in a database.

In aspect 16 according to any one of aspects 1 to 15, the content includes at least one of text data, image data, graphical data, video data, or audio data.

In another aspect, this document features a method that includes receiving information via a user interface provided on a display of a user device from a first user associated with a pre-determined user group. The information includes an identification of a) a source language and b) a target language to which translation from the source language is requested. The method also includes determining that one or more second users of the pre-determined user group is associated with the source language and associated with the target language. This can be determined based on accessing a data repository that stores language capabilities of users within the pre-determined user group. The language capabilities of the users within the user group are determined automatically based on mining a corpus of electronic documents associated with the pre-determined user group. The method further includes causing an identification of the one or more second users to be displayed on the user interface.

In another aspect, this document features a method that includes automatically inferring abilities of users to perform language translations. This can be done based on information in one or more documents associated with the users. The method also includes maintaining a database of the abilities of the respective users, and in response to an indication of a language translation to be performed for a user, querying the database to identify one or more candidate users to perform the language translation.

In another aspect, this document features a system that includes an analysis engine. The analysis engine includes a processor, and is configured to receive, via a user interface, from a first user associated with a pre-determined user group, an identification of a) a source language and b) a target language to which translation from the source language is requested. The analysis engine is also configured to determine that one or more second users of the pre-determined user group is associated with the source language and associated with the target language. This is done based on accessing a data repository that stores language capabilities of users within the pre-determined user group. The language capabilities of the users within the user group are determined automatically based on mining a corpus of email electronic documents associated with the pre-determined user group. The analysis engine is further configured to cause an identification of the one or more second users to be displayed on the user interface.

In another aspect, this document describes a system that includes an analysis engine. The analysis engine includes a processor, and is configured to automatically infer abilities of users to perform language translations. This can be done based on information in one or more documents associated with the users. The analysis engine is also configured to maintain a database of the abilities of the respective users. In response to an indication of a language translation to be performed for a user, the analysis engine is configured to query the database to identify one or more candidate users to perform the language translation.

In another aspect, this document features a computer readable storage device that stores a computer program product including machine-readable instructions. The instructions, when executed, cause a computer system to carry out operations that include receiving, via a user interface provided on a display of a user device, information from a first user associated with a pre-determined user group. The information includes an identification of a) a source language and b) a target language to which translation from the source language is requested. The operations include determining that one or more second users of the pre-determined user group is associated with the source language and associated with the target language. This is determined based on accessing a data repository that stores language capabilities of users within the pre-determined user group. The language capabilities of the users within the user group are determined automatically based on mining a corpus of electronic documents associated with the pre-determined user group. The operations also include causing an identification of the one or more second users to be displayed on the user interface.

In another aspect, this document features a computer readable storage device that stores a computer program product including machine-readable instructions. The instructions, when executed, cause a computer system to carry out operations that include automatically inferring abilities of users to perform language translations. This is determined based on information in one or more documents that the users are associated with. The operations also include maintaining a database of the abilities of the respective users. The operations further include querying the database, in response to an indication of a language translation to be performed for a user, to identify one or more candidate users to perform the language translation.

Implementations of the above aspects can include one or more of the following.

The user device can be verified to be associated with a user of the user group. The language capabilities of the users within the user group can be determined based on identifying a particular language from email and other electronic documents of the corpus, identifying one or more users associated with the email electronic documents, and storing the particular language as a language capability of the identified one or more users. At least some of the one or more users associated with the electronic documents can be each either a sender or a recipient of a threshold number of the electronic documents. The particular language can be identified from the electronic documents by analyzing an attachment associated with at least one of the electronic documents. The electronic documents can include a threshold quantity of text written by the identified one or more users. The display of the identification of the one or more second users can be based on a permission that allows a corresponding second user to be identified to one or more other users in the user group. The permission can be provided by the corresponding second user. The user interface can be provided on the display of the user device in response to receiving an indication that a translation task is to be performed. The electronic documents can include one or more of emails and documents attached to emails, or both. The abilities can include language capabilities and non-language capabilities.

In various implementations, the technology described in the document may provide one or more of the following advantages. Language capabilities of various users within an organization can be automatically and efficiently identified to another user who is in need of a translator or interpreter. A database of language capabilities and fluency can be automatically maintained and updated by analyzing electronic communication documents such as emails and instant messages, thereby avoiding the need to solicit feedback from individual users. Existing translation capabilities may be rapidly identified and tracked with various data analysis or data mining techniques. The identification of the translation capabilities may be performed in parallel to the composing of electronic communications or electronic documents. A faster and/or more accurate translation of electronic content may be achieved.

Other aspects, features, and advantages will be apparent from the description and the claims.

DETAILED DESCRIPTION

With ever-increasing global communications in various languages, particularly over electronic media, users in various corporate or other organizations often encounter situations in which they need to communicate in a language they are not familiar with. In some cases, it is useful to seek help from another individual (e.g., a co-worker) who is familiar with the particular language. While some companies or institutions may manually maintain a database on language capabilities of various employees or users, maintaining such a database manually may be inaccurate, outdated, and/or expensive. The technology described in this document can be used to create and maintain a database of language-capabilities for different users by analyzing ("mining") documents produced by those users. When a translation or other language-related need arises, the user in need may query the database and receive suggestions on other users who may be able to help out.

Language-related needs can be of various types. For example, an English-speaking user who is not proficient in Japanese may receive an email or document composed in Japanese and subsequently need help in translating the email or document to English. In such a case, the English-speaking user may need help from another user who has adequate reading and writing capabilities in both English and Japanese to help out with the task of translation. As another example, an English-speaking user may be meeting a person who speaks only Japanese, and may seek an interpreter with adequate spoken fluency in both languages. As another example, a team of English speakers traveling to Japan may wish to include someone with particular qualifications who is also fluent in Japanese.

In some implementations, if an organization's email communications and attachments (e.g., documents, files, etc.) and other non-email documents are stored in a data repository, the repository can be mined to identify language capabilities of various users. For example, if the emails and/or documents received or sent by a particular user indicate that the user regularly communicates in Japanese and English, a determination may be made that the particular user is proficient in both languages. This language-capability information for the particular user can be stored in a database. The database of the language capabilities can be automatically maintained and updated as users or employees are added or removed from the organization, and used to find the right person when a translation or other language-related need arises. While the following description uses emails as primary examples of electronic communications, the technology described here can be extended for other forms of electronic communications such as instant messages, multimedia messages, short messages, voicemails, and other non-email electronic communications.

Figure 1:
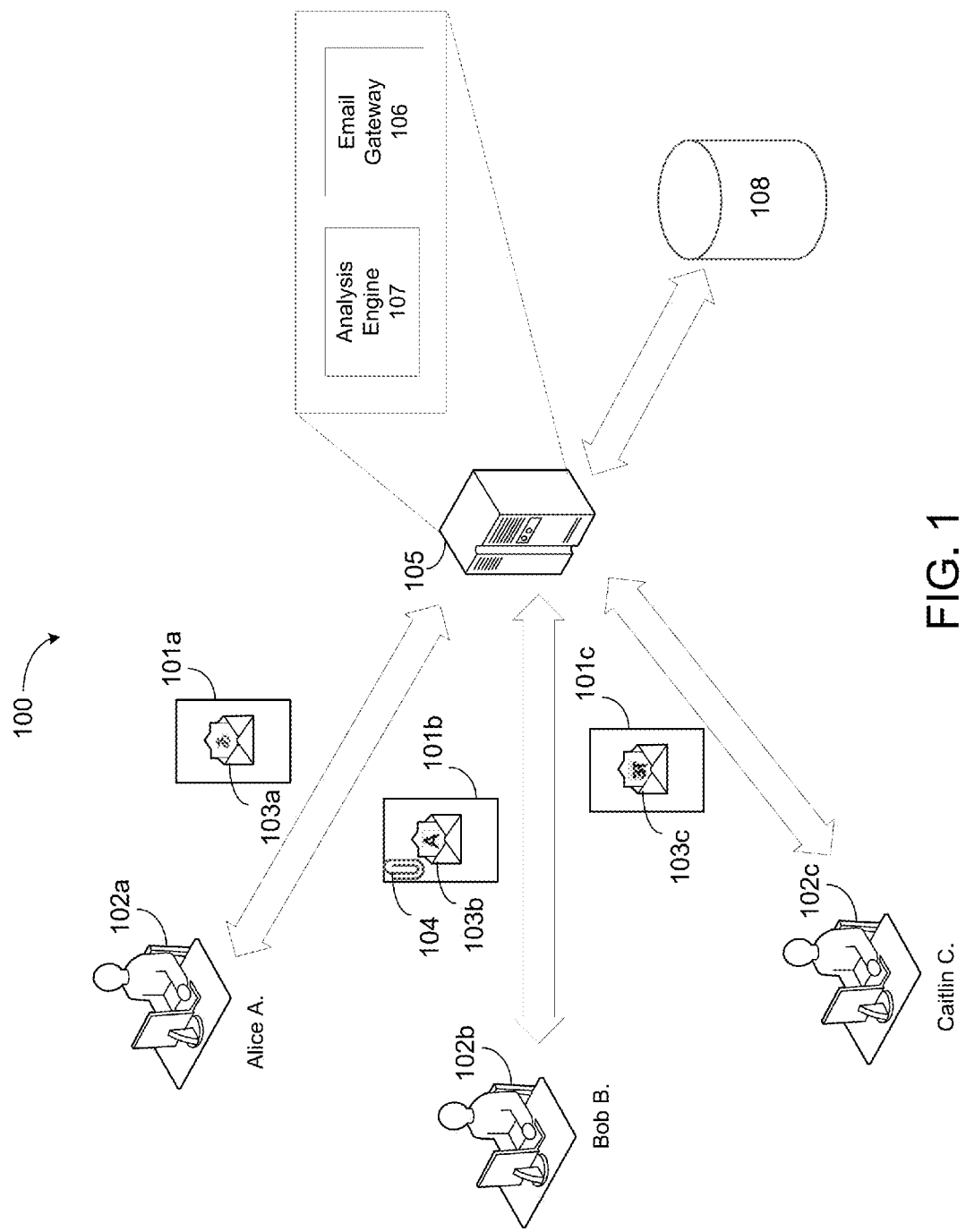
FIG. 1 is a block diagram of an email system.

FIG. 1 shows a block diagram of an example of a communication system 100 that can be used in automatically identifying the language capabilities of the various users 102a, 102b, 102c (102, in general) of the system. The users 102 exchange communications (which may also be interchangeably referred to as email communications) 101a, 101b, 101c (101, in general) via the communication system 100 that includes one or more server computers 105. (We will refer to a single server computer 105 in the foregoing text, but implementations of the communication system 100 may use a single server computer 105 or multiple server computers 105 operating in conjunction with one another, including, for example, a set of remote computers deployed as a cloud computing service.) The communications 101 can include various modes, media, methods, means, or mechanisms for carrying information between or among users 102. For example, the communications 101 can include emails, instant messages, blog posts, social media content, memoranda, news articles, videos, audio recordings, telephone calls, speeches, slide presentations, spreadsheets, word processing documents, or reports, to name a few. In some implementations, the communications 101 can include one or more attachments 104. Similar to the communications 101, the attachments 104 can also include, for example, emails, instant messages, blog posts, social media content, memoranda, news articles, videos, audio recordings, telephone calls, speeches, slide presentations, spreadsheets, word processing documents, or reports. In some implementations, mining a repository of email communications can include mining one or more types of the communications and/or attachments listed above.

In some implementations, the users 102 are employees or otherwise affiliated to a particular group or organization. A group or organization can include, for example, companies, employers, organizations, governments, or other entities that maintain a communication system similar to the system 100. The communications 101 exchanged by the users 102 may be created or composed by one of the users 102, or originating from a source external to the system 100 (e.g., a sender at another company or organization). Composing a communication 101 can include, for example, creating, formatting, assembling, authoring, or entering the communication 101. In some implementations, the email communications and/or attachments can be mined based on receiving appropriate permissions from the users composing or receiving the communications, or in accordance with standard policies of the organization. For example, employees of a particular organization may be notified (e.g., via employment contracts) that the emails and documents exchanged using the organization's email system might be stored and mined, for example, to identify language capabilities of the users. Users may be given an option to opt out of this data mining. In this way, the privacy preferences of each user can be preserved.

The communications 101 include various content 103a, 103b, 103c (103, in general). The content 103 can include various aspects, features, or elements of the communications that could have meaning or value or use for the users 102. The content 103 can include, for example, letters, words, phrases, sentences, numbers, images, video, graphics, and audio, a combination of which may convey, for example, intent, concepts, plans, goals, wishes, models, characterizations, or ideas of one or more users. The content 103 can be in various languages. For example, in FIG. 1, the content 103a is in Japanese, content 103b is in English, and content 103c is in Hindi. In some implementations, the content 103 may be depicted in a corresponding script, or phonetically represented using another script. For example, Hindi content may be represented using Devanagari script, or may be phonetically represented using English script. Voice recognition applied to audio may reveal spoken fluency while leaving written fluency undetermined.

At least some of the communications 101 to and from the users 102 can be archived within the server computer 105. In some implementations, the communications 101 archived at the server computer 105 can include information that has been stored, held, placed in a repository, accumulated, aggregated, transmitted, or assembled from the communications that pass through the server computer 105. The archived communications can be stored, for example, within a storage device that is local to the server computer, or within a storage device that is remote to, but accessible by, the server computer 105. In some implementations, archiving the communications 101 can be made scalable, with the size of the archive being progressively increased as the number of archived communications continues to increase.

In some implementations, the server computer 105 can include a messaging gateway such as an email gateway 106 through which the communications 101 are exchanged. Even though FIG. 1 shows an email gateway 106 as an example of the messaging gateway, the technology described in this document can also be used with other messaging gateways such as a short messaging service (SMS) gateway or a multimedia messaging service (MMS) gateway. In some implementations, the email gateway 106 can be implemented as a part of the server computer 105. In some implementations, the email gateway 106 can include a computing device or module that serves as an interface between a client device of a user (we sometimes refer to a client device of a user as a user device) and the server computer 105. For example, the email gateway 106 may be configured to receive an external communication from a sending device, and forward the external communication to a user 102 as a communication 101.

In some implementations, the email gateway 106 may be configured to extract information (e.g., recipient information) from a received email message, and communicate the information to the server computer 105 such that the server computer may direct the email message to the correct recipient. For the return path, the email gateway can be configured to receive a communication 101 from the server computer 105, and forward the communication 101 as an email message to the appropriate recipient device (e.g., an external server).

In some implementations, the server computer 105 includes an analysis engine 107 that analyzes the communications passing through the server computer 105 (and/or the email gateway 106) to determine language capabilities of the users 102 associated with the communications 101. For example, the analysis engine 107 can be configured to analyze the communications 101 to identify a language of the corresponding content 103. In some implementations, the analysis engine 107 operates on a different system than the server computer 105, and the server computer 105 communicates with (e.g., transfers data to and from) the other system.

The analysis engine 107 can be configured to perform language identification in various ways. For example, in some implementations, the analysis engine 107 can make use of stored tables of frequently used words and/or distinctive letters or characters to identify and distinguish between different languages. For languages that use distinctive scripts (e.g., Japanese or Hebrew), the analysis engine 107 may use a character recognition engine (e.g., an optical character recognition (OCR) system) to identify the script, and determine the language based on the identified script. For languages that share a common or overlapping script (e.g., English and Spanish), the analysis engine 107 can also use tables of frequently occurring words to distinguish between such languages. To distinguish between dialects or languages that share commonly occurring words, the analysis engine 107 can make use of more complex tools such as orthography. Orthographic information used by the analysis engine 107 can include various rules for using a script to write a particular language. Such rules can include, for example, rules of spelling, hyphenation, capitalization, word breaks, emphasis or punctuation. Orthographic information can also be used in distinguishing between dialects or regional variations of a same language (e.g., British English and American English). Sometimes language identification will be available in the form of explicit language tags, as in the optional "Content-Language" field of email and other MIME objects.

In some implementations, the analysis engine 107 can be configured to use various computational techniques to identify languages. For example, a language can be identified by determining a compressibility of text written in the language. In such cases, a mutual information based metric can be used to measure compressibility as distances between different words, and the measured compressibility can be compared with known values to identify a language. In some implementations, the analysis engine 107 can be configured to use machine learning techniques to identify languages. For example, during a training phase, the analysis engine 107 can be trained using training data (e.g., n-gram models) for various languages. A trained analysis engine 107 can be configured to extract features from given text during runtime, and identify or distinguish between the languages based on the extracted features. Various types of machine-learning techniques may be used in identifying or classifying various languages. Various supervised, unsupervised, or semi-supervised machine learning techniques can be used by the analysis engine 107 to identify or classify languages. The analysis engine 107 can use various tools in implementing such machine-learning techniques. Examples of such tools include decision trees, artificial neural networks, support vector machines, Bayesian statistics, classifiers, Markov models, and conditional random fields. Other techniques for language identifications are also possible.

The analysis engine 107 can be configured to identify language capabilities of the various users 102 of the system 100 by analyzing the communications 101 originating from, or directed to, the users 102. The determined language capabilities of the users 102 can then be stored, for example, within a database 108. In some implementations, the server computer 105 may have access to several databases 108. The database 108 may be available locally to the server computer 105 (for example, in a data storage component of the server computer 105), or may be accessible via a network such as a local area network (LAN) or the Internet. In some implementations, the analysis engine 107 can also be configured to identify capabilities that are independent of the language capabilities. Such capabilities can be referred to as non-language capabilities. The analysis engine can also be configured to identify the language and/or non-language capabilities by analyzing other sources of information including, for example, browsing histories, social media profiles, or blogs associated with the users. The non-language capabilities may be capabilities such as proficiency in an academic discipline (e.g., actuarial mathematics, accounting, world history, linguistics, etc.) or proficiency in a technical skill (e.g, a programming language such as Perl or Java, an engineering topic such as Internet protocol standards, etc.) or proficiency in another area of knowledge (e.g., sports trivia, rock music, etc.).

The analysis engine 107 can be configured to determine language capabilities of the users 102 in various ways. In some implementations, a user 102 is determined to have a particular language capability if an amount of communications 101 received or sent by the user in the particular language satisfies a threshold condition. For example, if the analysis engine 107 determines that the user 102*a* (Alice A.) sends or receives a predetermined percentage (e.g., 20%) of communications in Japanese, the user 102*a* may be identified as a person proficient in Japanese. In some implementations, incoming and outgoing communications may be analyzed separately to determine language capabilities. For example, if 20% of incoming communications and 0% of outgoing communications for user 102*a* is determined to be in Spanish, the analysis engine 107 may infer that the received Spanish communications are either sent to the user 102*a* in error or unsolicited email (e.g., "spam"), and that the user 102*a* does not actually communicate in Spanish. In contrast, if the user 102*a* replies, forwards, archives, or otherwise acts on the Spanish incoming communications, the analysis engine 107 may infer that user 102*a* is proficient in Spanish above a threshold of proficiency.

In some implementations, the analysis engine 107 can be configured to determine various types of language capabilities for the users 102. For example, if a user receives a significant amount of communications (e.g., 20%) in Spanish, but responds to those communications in English, the analysis engine 107 can be configured to infer that the user likely understands Spanish, but does not have the capability of writing Spanish. In another example, if a user 102*c* receives and/or responds to communications in Hindi, but rather than using Devanagari script, represents Hindi words using English script, the analysis engine 107 may infer that the user 102*c* likely speaks Hindi but does not read or write the script associated with the language.

In some implementations, the analysis engine 107 can determine if a user may be proficient in speaking a particular language. In some examples, if a user receives communications written in a language, but does not reply in that language, the analysis engine 107 may infer that the user speaks that language. For example, the analysis engine 107 may be configured to infer that proficiency in reading a language correlates to proficiency in speaking that language. In some examples, a user may send or receive communications containing an audio recording in a particular language. For example, a user may send a voice message attached to a communication. The analysis engine 107 may be configured to determine the language of the voice message (e.g., using speech recognition techniques) and use this determination to infer that the user speaks the determined language, especially if the user has sent or received other voice communications in the determined language. The voice message may be a voicemail, or a recording of a conversation (e.g., a recording of a meeting), or another kind of voice message.

The analysis engine 107 can also be configured to determine a user's level of proficiency in a language from the nature of the communications from the user. For example, if a user 102 frequently writes long emails in a particular language (e.g., Hebrew), the analysis engine 107 may infer that the user is fluent in the language. In contrast, if the user exchanges only short, colloquial communications in the particular language, the analysis engine 107 may infer that the user's capability in the language is limited to a conversational level. In some implementations, the users' capability in the language can be inferred using other techniques such as comparing a vocabulary used by the user to a database of words arranged by complexity. For example, if a user frequently uses complex words and/or sentence constructs, the analysis engine 107 may infer that the level of proficiency of the user in the particular language is high.

In some implementations, the level of fluency of a user in a particular language, as identified by the analysis engine, can be used, for example, in determining or suggesting how the user may help in a language-related need. For example, if a user is determined to speak but not read/write Hindi, the analysis engine 107 may suggest the name of the user for interpretation tasks, but not for document translation tasks. In contrast, if a particular user is determined to be highly proficient in reading and writing both Hebrew and English, the analysis engine 107 can be configured to suggest the name of the user for tasks that require translating documents from Hebrew to English or vice-versa. Alternately, a user who reads but does not write Hebrew might be suggested for one-way translation of documents from Hebrew to English.

In some implementations, the analysis engine 107 can use other information to determine that a user is likely to read, write, or speak a particular language. In some examples, metadata may indicate a language of a document or communication. For example, a document may contain metadata indicating that it is written in a particular language. The metadata could be used by the analysis engine 107 as a data point to support an inference that the user reads, writes, or speaks the particular language. As another example, a communication may contain a header (e.g., an email header such as "Content-Language") indicating that it is written in a particular language. The header could be used by the analysis engine 107 as a data point to support an inference that the user reads, writes, or speaks the particular language. As another example, in some implementations, documents or communications may be associated with a character set. The analysis engine 107 can identify the character set to make an inference about the language used. For example, if a document or communication includes characters of a Hebrew character set, the analysis engine 107 may infer that the sender or receiver of the communication can write or read Hebrew, especially if the document or communication contains a threshold percentage of Hebrew characters (e.g., more than 20% of the content being Hebrew characters).

The language capability of users 102, as determined by the analysis engine 107, is stored within the system 100, for example, in a database 108. In some implementations, more than one database 108 may be used for storing information about the language capabilities of the users 102. The database 108 can be local to the server computer 105 or stored in a storage device remote to the server computer 105 (e.g., accessible on a local area network or on a wide area network such as the Internet), possibly deployed in the form of a cloud-based service.

In some implementations, access to the information stored within the database 108 can be provided via a user interface displayed on a computing device of a user 102. For example, a user interface can be provided to a requester of a translation task to query the source and target languages involved in the task, and based on information stored in the database, a person proficient in both languages can be identified as a potential candidate. An identification of the potential candidate can be presented to the requester via the same user interface or another channel such as email or instant messaging. In some implementations, permission may be sought from the potential candidate before he/she is identified to the requester. Once a potential candidate agrees to be identified, a channel of communication can be initiated automatically (e.g., via email, or internal portal) to facilitate the translation task (e.g., to exchange documents to be translated).

Figure 2A:
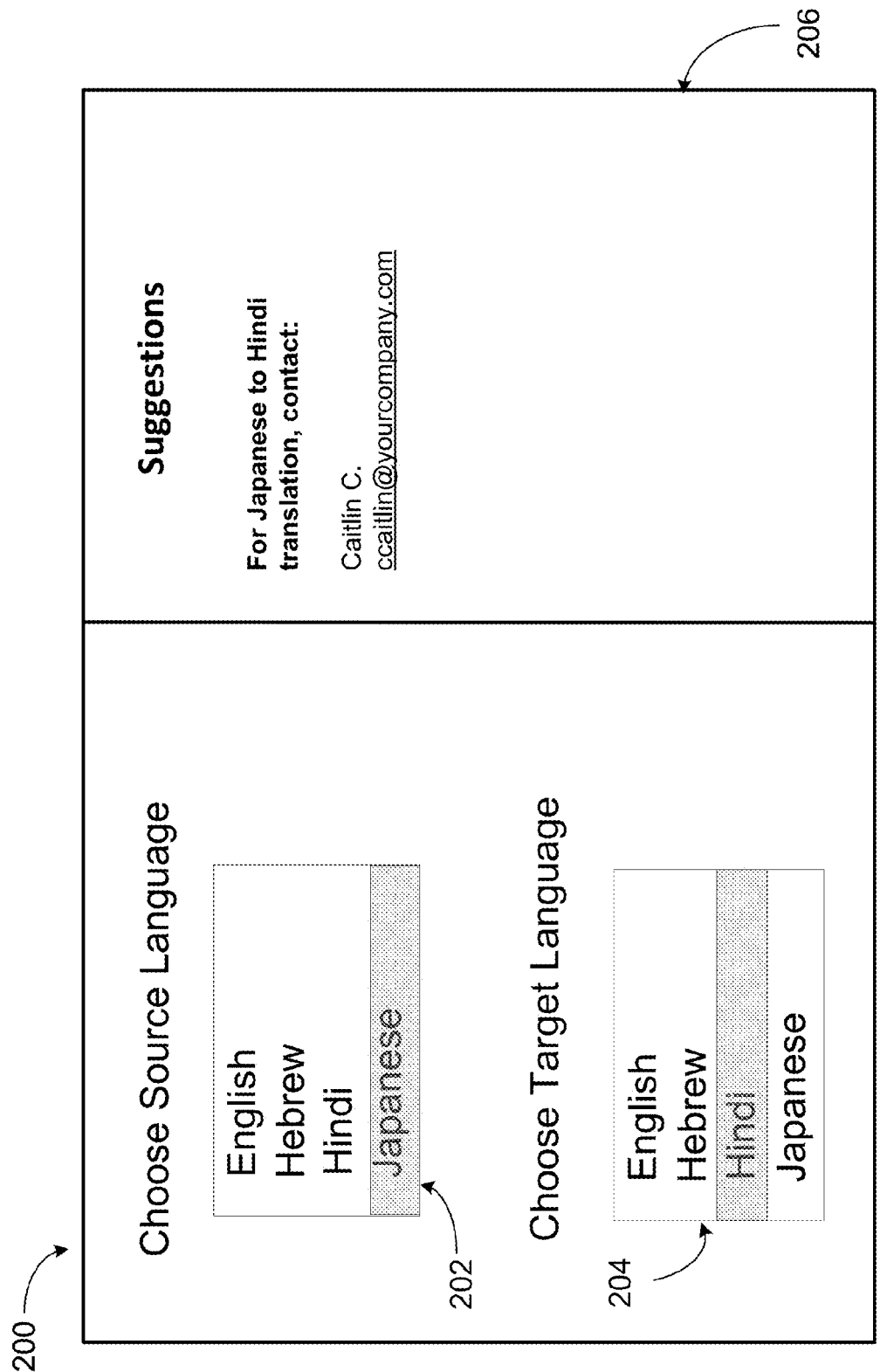
FIG. 2A is an example of a user interface used in automatic translator identification.

An example of such a user interface 200 is shown in FIG. 2A. In some implementations, the user interface 200 provides a control 202 for selecting a source language and another control 204 for selecting a target language. If a user 102 needs help with translating a document from a first language (e.g., Japanese) to a second language (e.g., Hindi), the use can specify the first language as a source language using the control 202, and the second language as the target language using the control 204. The controls 202, 204 can include, for example, a drop-down menu, a user-selectable button, a fillable text field, or another control that allows a user to input the source and target language for the translation task. In some implementations, the target language can be set to a predefined language (e.g., English). In such cases, the user interface 200 includes the control 202 for specifying the source language, but not the control 204 for specifying the target language. In some implementations, the controls 202 and 204 can be configured to accept multiple languages as the source and target languages, respectively. For example, an organization in Montreal, Canada may have a need for a person who is capable of translating from Japanese to at least one of French and English. In some implementations, the user interface 200 can also include a control for specifying one or more non-language capabilities. For example, the user interface 200 can include a control for specifying one or more keywords (e.g., "finance" or "Java") related to the non-language capabilities desired for a task at hand. Here, by "non-language capabilities," we mean a skill associated with a user other than spoken or written fluency in a natural human language such as French, English, etc. Instead, a non-language capability can be any other skill that can be inferred from a user's documents or communications, such as proficiency in an academic discipline, proficiency in a technical skill, etc.

Upon receiving the user-input via the control 202 and possibly also the control 204, the analysis engine 107 determines one or more candidate users 102 who have the language capabilities that match the source and target languages. In some implementations, information on the matching candidates can be sent to the requesting user over a separate communication. For example, information on the matching candidates can be sent to the requesting user over an email, text message, instant message, or another form of communication. In some implementations, the matching candidates can be displayed, for example, in a suggestion window 206 of the user interface 200. In the example shown in FIG. 2A, where the source language is Japanese and the target language is Hindi, the analysis engine 107 displays the name "Caitlin C." based on determining that Caitlin has the required proficiency for translating a document from Japanese to Hindi.

The suggestion window 206 of the interface 200 can be configured to display different types of information. For example, the suggestion window 206 of the interface 200 may display contact information (e.g., address information such as an email address, phone number, or instant message handle) about the candidate user(s) who have the required proficiency in the source and target languages. In some implementations, the suggestion window 206 of the interface 200 can be configured to display the level of proficiency (e.g., "fluent" in reading/writing, and "conversational" in speaking) of the candidate users. In some implementations, the suggestion window 206 can be configured to also display information such as a candidate user's job title, photograph, web page, social media page, or other source of additional information about the suggested user.

In some implementations, where more than one candidate users are available, the suggestion window 206 of the interface 200 can include a control for sorting the candidate users based on one or more parameters. For example, the one or more candidate users may be sorted based on the levels of proficiency of the candidate users. In some implementations (e.g., where the analysis engine 107 can access the calendars of the users 102), the candidate users may be sorted based on the availability of the candidate users and/or the requesting user, or based upon job titles, keywords, or other attributes of the candidate users. In some implementations, the suggestion window 206 of the interface 200 can include a control for initiating a communication between the requesting user and one or more of the candidate users. For example, once the requesting user selects a candidate user (e.g., by activating the appropriate control), an instant messaging, telephone, email or other communication session may be automatically initiated between the users so that they can discuss the translation task.

Figure 2B:
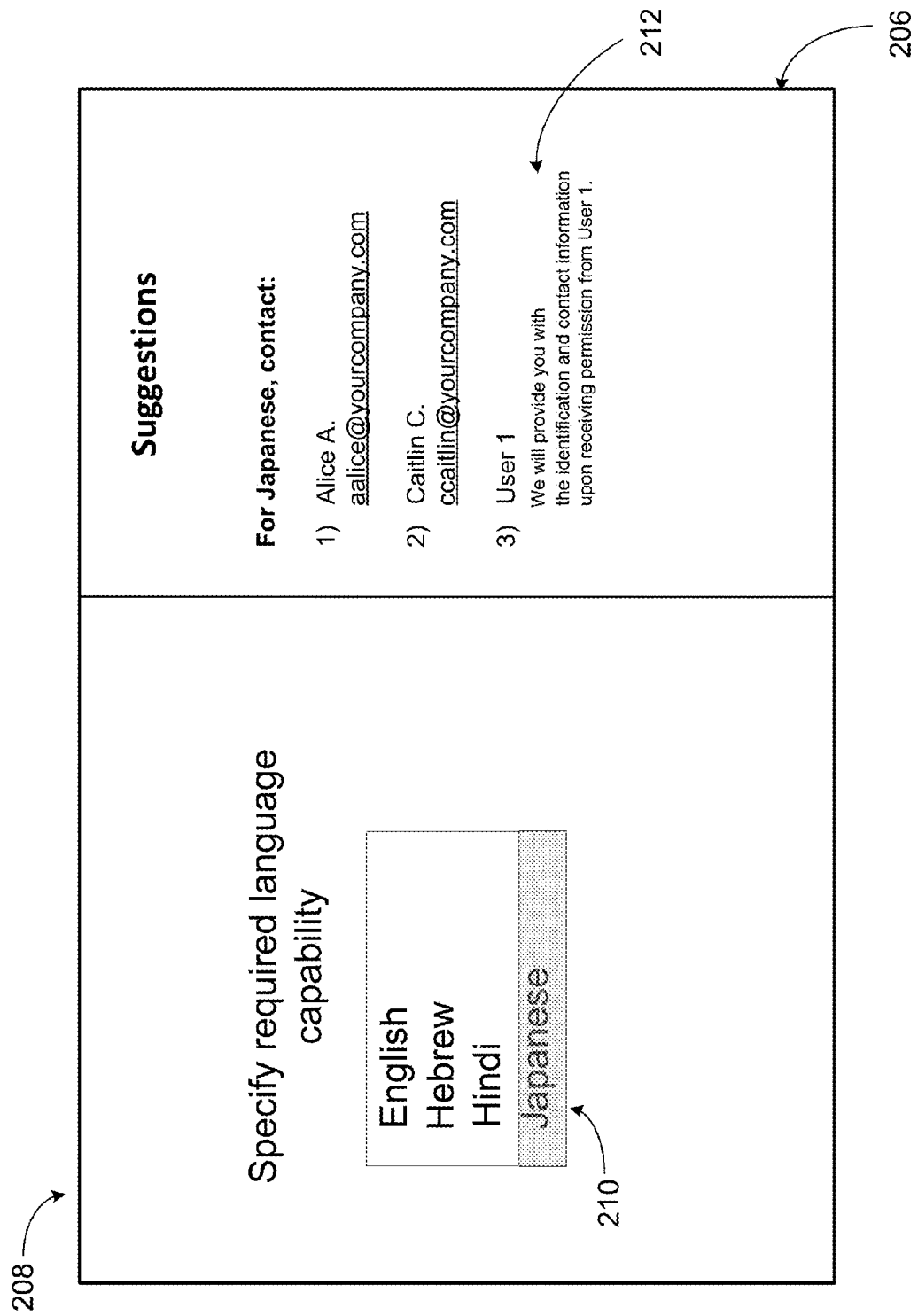
FIG. 2B is an example of a user interface used in identifying language capabilities of users.

FIG. 2B shows another example user interface 208 that may be presented to a requesting user. The user interface 208 can be provided, for example, when the requesting user needs a person to act as an interpreter in a meeting, and it is known that all users 102 within the organization have English speaking abilities. The user interface 208 includes a control 210 that allows a requesting user to specify a required language capability of a language-related task. The control 210 can be substantially similar to the controls 202 and 204 described above with reference to FIG. 2A.

In some implementations, the interface 208 can include the suggestion window 206 for displaying a list of candidate users. The list of candidate users displayed within the interface 208 can however be different from the list of users displayed within the interface 200. In the example shown in FIG. 2B, where the language specified using the control 210 is Japanese, the list of users displayed in the suggestion window 206 includes more users than the corresponding list in FIG. 2A (which was specific for a translation task from Japanese to Hindi). This is because not all users with language capabilities in Japanese would also have the capability to translate to Hindi.

The names or contact information within the suggestion window 206 can be displayed based on appropriate permissions received from the candidate users. In the example shown in FIG. 2B, the suggestion window 206 displays three entries, One entry 212 lists a user (e.g., Bob B.) anonymously. The entry 212 can be updated or removed from the suggestion window 206 based on whether or not Bob B. provides the appropriate permissions, respectively. The permissions can be sought from the candidate users using any form of communications 101 described above with reference to FIG. 1.

Figure 3:
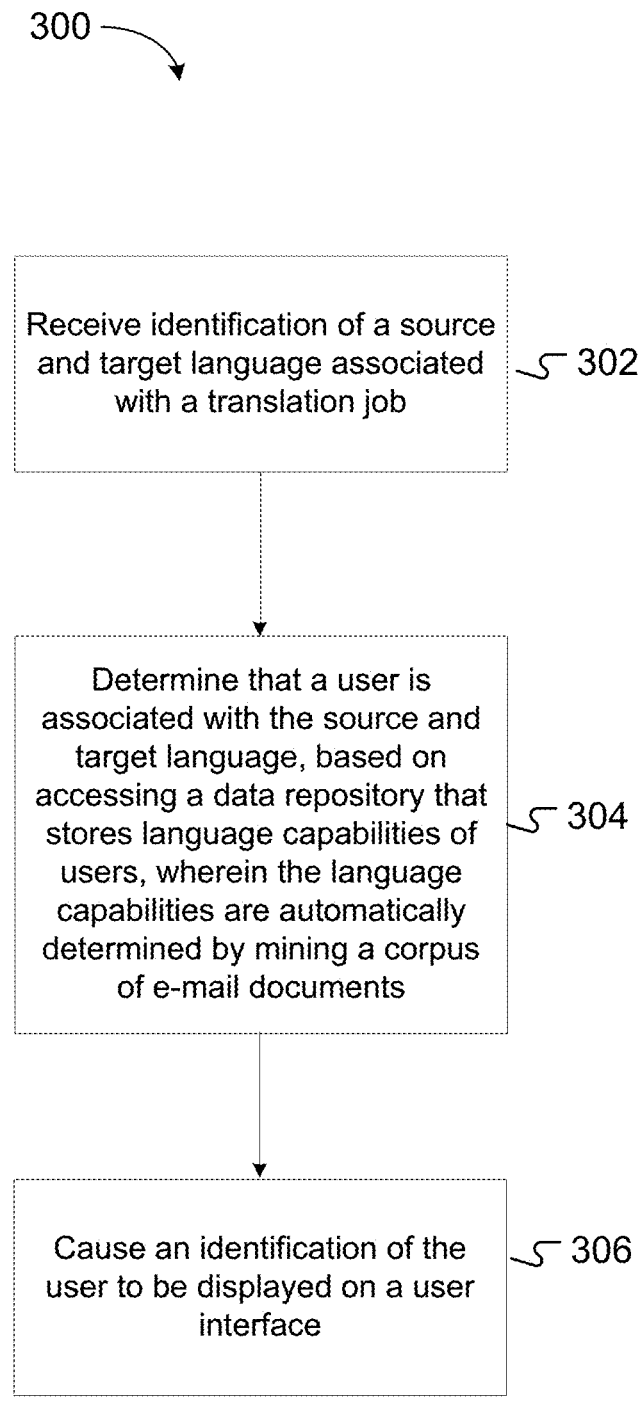
FIG. 3 is a flowchart showing an example sequence of operations for storing language capabilities of users.

FIG. 3 shows an example of a process 300 representing a sequence of operations for storing language capabilities of users. The operations described with respect to the process 300 can be performed by one or more processors within the system 100 described with respect to FIG. 1. For example, one or more of the operations can be executed by a processor within the server computer 105 (e.g., by a processor of the analysis engine 107). In some implementations, one or more of the operations can be performed by a processor housed within a computing device of a user 102.

The operations include receiving an identification of a source and target language associated with a translation task (302). The source and target language can be identified by a first user associated with a pre-determined user group via a user interface that is displayed on a computing device of the first user. The source language is the language from which a translation is needed, and the target language is the language to which the source language is to be translated. The pre-determined user group can be users associated with a particular organization. For example, the pre-determined user group can include employees of a company that use the company's email system. In some implementations, the pre-determined user group can include one or more of the first user's contacts (as retrieved from the first user's electronic address book, or profiles on one or more social network). In some implementations, the user interface can be presented to the first user upon verifying that the first user is associated with the pre-determined user group. For example, the first user may be asked for authentication information (e.g., company log-in id and password) before the user interface is presented to him/her. The user interface can be provided to a user based on receiving an indication from the user that a translation task is to be performed.

The operations include determining that a second user is associated with both the source language and the target language, based on accessing a data repository that stores language capabilities of multiple users (304). The language capabilities of the multiple users can be automatically determined by mining a corpus of email documents. For example, the multiple users can be associated with the pre-determined user group that also includes the first user and the language capabilities of the multiple users can be determined by automatically mining (i.e., using a computing device) a corpus of email documents sent and received by the multiple users. This can include, for example, identifying one or more languages from the email documents of the corpus, and identifying the users associated with the corresponding email documents. For example, the corpus can be mined to identify emails sent and received in French, and users that receive and/or send at least a threshold percentage of their emails in French can be identified as having capabilities in the French language. In some implementations, a check may be performed to determine that the identified email documents (which in this example are the emails in French) include a threshold quantity of text in the particular language written by the corresponding users. Mining the corpus of email documents can include also mining documents associated with the emails as attachments. The language capabilities of the various users can then be stored in the data repository. In some implementations, a level of fluency associated with each user's language capability can also be stored in the data repository. Determination of such levels of fluency can be substantially as described above with reference to FIG. 1. In some implementations, language or non-language capabilities can also be determined by mining (with appropriate permissions from the users) browsing histories, social media profiles, or blogs associated with the users.

In some implementations, a non-language capability can be determined by identifying, in the corpus of documents associated with a user, key words or phrases associated with the non-language capability. For example, if the non-language capability is "finance," the capability of a user in finance may be determined by identifying key words related to the discipline of finance among documents associated with the user. In some implementations, the key words may be determined based on the contents of a database specific to finance terms that is accessible to the analysis engine 107. In some implementations, the key words may be determined based on the contents of a network resource (e.g., a web site) that is accessible to the analysis engine 107.

The operations further include causing an identification of the second user to be displayed to the first user (308). In some implementations, the identification of the second user can be displayed using a user interface (which can be a portion of the user interface used for accepting inputs on the source and target languages from the first user). The user interface can be provided on the display of the first user, for example, in response to receiving an indication that a translation task is to be performed. In some implementations, the identification of the second user can be provided to the first user using some form of the communications 101 described with reference to FIG. 1. In some implementations, the second user can be identified to the first user based on a permission that allows the second user to be identified to one or more other users. For example, if a particular user opts out from helping in translation tasks, the particular user may not be identified as a potential candidate even if he/she has suitable language capabilities. In some implementations, the permissions can be provided by the users themselves, or be based on company policies. For example, users at or above a certain level in the company hierarchy may not be identified as potential translators even if they have the required language capabilities. In another example, users that are within only the same sub-group (e.g., technical, or legal) of a company may be identified to one another as potential candidates to help out with language-related needs.

Figure 4:
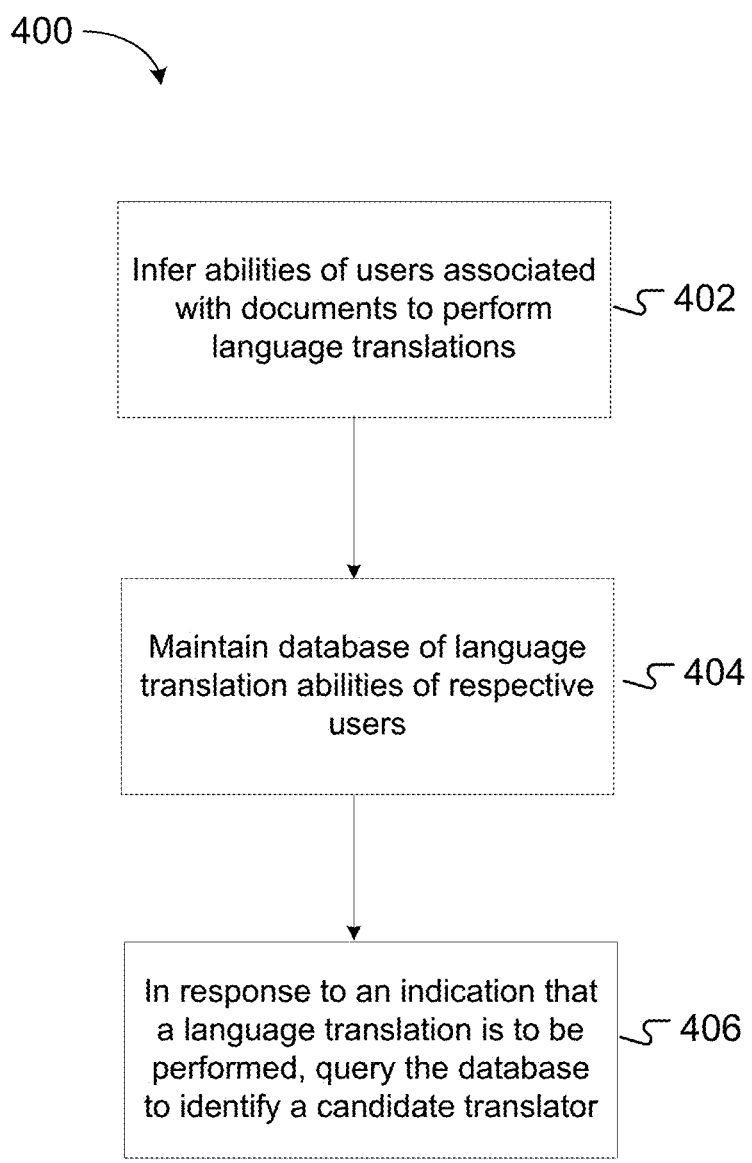
FIG. 4 is a flowchart showing an example sequence of operations for identifying a potential translator.

FIG. 4 shows an example of a process 400 representing a sequence of operations for identifying a potential translator. The operations described with respect to the process 400 can be performed by one or more processors within the system 100 described with respect to FIG. 1. For example, one or more of the operations can be executed by a processor within the server computer 105 (e.g., by a processor of the analysis engine 107).

The operations include inferring abilities of one or more users to perform language translations (402). Such abilities can be inferred automatically by a computing device based on information in documents associated with the users. For example, the abilities may be inferred by analyzing a corpus of email documents (and possibly attachments associated with the email documents) associated with the users. The abilities of the users to perform such language translations can be inferred, for example, by a computing device substantially similar to the analysis engine 107 described with reference to FIG. 1.

The operations also include maintaining a database of the language translation abilities for the respective users (404). An example of such a database could be one in which a company or organization maintains the language capabilities of its employees and/or affiliates based on, for example, mining the emails sent and received by the employees or affiliates over the company's email system. In such cases, the database can be maintained, for example, at a server owned by or accessible by the company's computing systems.

The operations can also include querying the database to identify a candidate for performing a translation task (406). This can be done, for example, in response to an indication that a particular user is in need for the translation task. For example, if the particular user indicates that he/she needs the help of someone who can translate from French to English, the database can be queried to identify a list of candidate translators who has the required capabilities in French and English. The query can be performed using one or more query languages used for querying databases. For example, the query language can include one or more of: data mining extensions (DMX) used for querying data mining models, a structured query language (SQL) used for querying relational database management systems, an object query language (OQL), a concept-oriented query language (COQL) used for concept oriented models (COM), or other languages or tools used for retrieving information from a database system.

Figure 5:
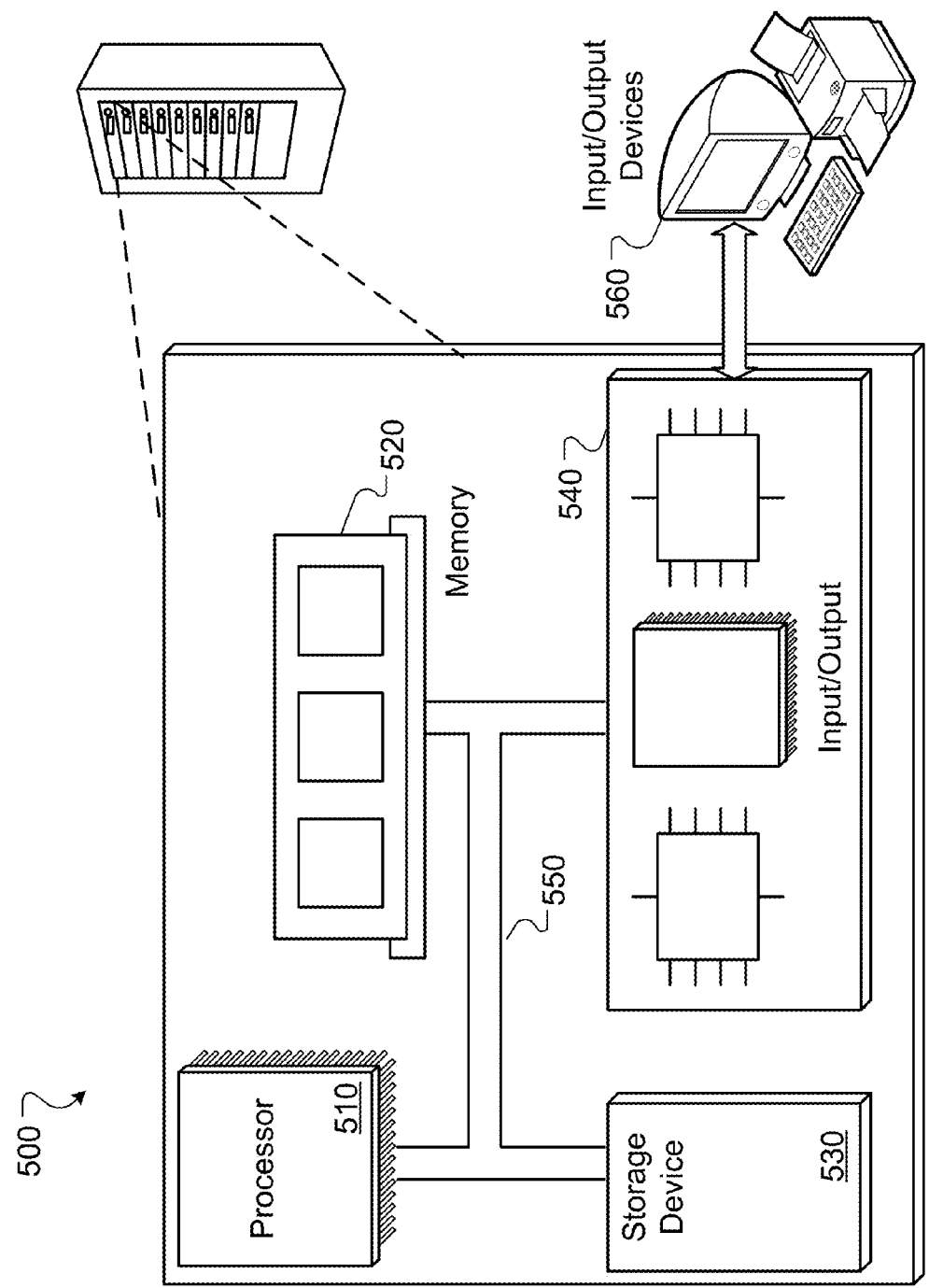
FIG. 5 is a block diagram of a computing device.

FIG. 5 is a block diagram of an example computer system 500 that can be used in implementing the technology described in this document. For example, one or more of the server computer 105, the analysis engine 107, and the email gateway 106 can include one or more instances of the system 500 described here. General-purpose computers, network appliances, mobile devices, or other electronic systems associated with the users 102 can also include at least portions of the system 500. For example, the user interfaces 200 and 208 of FIGS. 2A and 2B may be displayed on a computer system 500. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530.

The memory 520 stores information within the system 500. In some implementations, the memory 520 is a non-transitory computer-readable medium. In some implementations, the memory 520 is a volatile memory unit. In some implementations, the memory 520 is a non-volatile memory unit.

The storage device 530 is capable of providing mass storage for the system 500. In some implementations, the storage device 530 is a non-transitory computer-readable medium. In various different implementations, the storage device 530 can include, for example, a hard disk device, an optical disk device, a solid-date drive, a flash drive, or some other large capacity storage device. For example, the storage device may store long-term data, such as data stored in the database 108 shown in FIG. 1. The input/output device 540 provides input/output operations for the system 500. In some implementations, the input/output device 540 can include one or more of a network interface devices, e.g., an Ethernet card, a serial communication device, e.g., an RS-232 port, and/or a wireless interface device, e.g., an 802.11 card, a 3 G wireless modem, or a 4 G wireless modem. A network interface device allows the system 500 to communicate, for example, transmit and receive data such as emails sent between users 102. In some implementations, the input/output device can include driver devices configured to receive input data and send output data to other input/output devices, e.g., keyboard, printer and display devices 560. In some implementations, mobile computing devices, mobile communication devices, and other devices can be used.

In some implementations, the server computer 105 (FIG. 1) can be realized by instructions that upon execution cause one or more processing devices to carry out the processes and functions described above, for example, communicating with devices associated with the users 102, storing a corpus of email documents and mining the corpus to determine language capabilities of the users. Such instructions can comprise, for example, interpreted instructions such as script instructions, or executable code, or other instructions stored in a computer readable medium. The server computer 105 can be distributively implemented over a network, such as a server farm, a set of widely distributed servers, or a cloud computing service, or can be implemented in a single computing device.

Although an example processing system has been described in FIG. 5, implementations of the subject matter and the functional operations described above can be implemented in other types of digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible program carrier, for example a non-transitory computer-readable medium, for execution by, or to control the operation of, a processing system. The non-transitory computer readable medium can be a machine readable storage device, a machine readable storage substrate, a memory device, a composition of matter effecting a machine readable propagated signal, or a combination of one or more of them.

The term "system" may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry. The server computer 105 can be a general purpose computer, a custom-tailored special purpose electronic device, or a combination of the two.

Implementations can include a back end component, e.g., a data server, or a middleware component, e.g., an application server, or a front end component, e.g., a client computer having a graphical user interface or a Web browser through which a user can interact with an implementation of the subject matter described is this specification, or any combination of one or more such back end, middleware, or front end components.

The components of the system can be interconnected by any form or medium of digital data communication, e.g., a communication network. Examples of communication networks include a local area network ("LAN") and a wide area network ("WAN"), e.g., the Internet.

Certain features that are described that are described above in the context of separate implementations can also be implemented in combination in a single implementation. Conversely, features that are described in the context of a single implementation can be implemented in multiple implementations separately or in any sub-combinations.

The order in which operations are performed as described above can be altered. In certain circumstances, multitasking and parallel processing may be advantageous. The separation of system components in the implementations described above should not be understood as requiring such separation.

Other implementations are within the scope of the following claims.

The invention claimed is:

1. A method comprising:
receiving, by one or more computers, data entered at a user interface provided on a display of a user device from a first user associated with a pre-determined user group, the data comprising an identification of a) a source language and b) a target language to which translation from the source language is requested;
determining, by at least one of the computers, that one or more second users of the pre-determined user group is associated with the source language and associated with the target language, each of the second users being a candidate to perform a translation from the source language to the target language, based on accessing a data repository that stores language capabilities of users within the pre-determined user group, the language capabilities of the users within the pre-determined user group being determined automatically based on mining a corpus of electronic documents associated with the pre-determined user group; and
transmitting, by at least one of the computers, an identification of the one or more second users, each of whom is a candidate to perform a translation from the source language to the target language, to the user device for display on the user interface,
wherein the display of the identification of the one or more second users is based on a permission that allows a corresponding second user to be identified to one or more other users in the pre-determined user group.

2. The method of claim 1, comprising verifying that the user device is associated with a user of the pre-determined user group.

3. The method of claim 1, wherein the language capabilities of the users within the pre-determined user group are determined based on:
identifying a particular language from the electronic documents of the corpus;
identifying one or more users associated with the electronic documents; and
storing the particular language as a language capability of the identified one or more users.

4. The method of claim 3, wherein at least some of the one or more users associated with the electronic documents are each either a sender or a recipient of a threshold number of the electronic documents.

5. The method of claim 3, wherein identifying the particular language from the electronic documents comprises analyzing an attachment associated with at least one of the electronic documents.

6. The method of claim 3, comprising determining that the electronic documents include a threshold quantity of text written by the identified one or more users.

7. The method of claim 1, wherein the permission is provided by the corresponding second user.

8. The method of claim 1, comprising:
providing the user interface on the display of the user device in response to receiving an indication that a translation task is to be performed.

9. The method of claim 1, wherein the electronic documents comprise one or more of emails and documents attached to emails.

10. A method comprising
based on information in one or more documents, automatically inferring, by one or more computers, abilities of users associated with the documents to perform language translations, the abilities including language capabilities and non-language capabilities;
maintaining a database of the abilities of the respective users;
receiving, by at least one of the computers, an indication of a language translation to be performed for a user;

in response to the indication of the language translation to be performed for the user, querying, by at least one of the computers, the database to identify one or more candidate users to perform the language translation; and determining, by the database, the one or more candidate users to perform the language translation using the language capabilities and non-language capabilities of the one or more candidate users.

11. The method of claim 10, wherein the documents include emails or attachments of emails or both.

12. The method of claim 10, wherein automatically inferring language capabilities and non-language capabilities of users associated with the documents comprises automatically inferring, for each of the users, a proficiency in an academic discipline.

13. The method of claim 10, wherein automatically inferring language capabilities and non-language capabilities of users associated with the documents comprises automatically inferring, for each of the users, a proficiency in a technical skill.

14. The method of claim 10, wherein:
receiving, by at least one of the computers, the indication of the language translation to be performed for the user comprises receiving the indication of the language translation to be performed for the user and a particular non-language capability; and determining, by the database, the one or more candidate users to perform the language translation using the language capabilities and non-language capabilities of the one or more candidate users comprises determining the one or more candidate users to perform the language translation who each have the particular non-language capability.

15. The method of claim 10, wherein:
receiving, by at least one of the computers, the indication of the language translation to be performed for the user comprises receiving the indication of the language translation to be performed for the user and a technical skill required for the language translation; and determining, by the database, the one or more candidate users to perform the language translation using the language capabilities and non-language capabilities of the one or more candidate users comprises determining the one or more candidate users to perform the language translation using the technical skills of the one or more candidate users.

16. A system comprising:
a data repository that stores language capabilities of users within a pre-determined user group, the language capabilities of the users within the pre-determined user group being determined automatically based on mining a corpus of electronic documents associated with the pre-determined user group; and an analysis engine comprising a processor, the analysis engine configured to:
receive data entered at a user interface of a user device by a first user associated with the pre-determined user group, the data comprising an identification of a) a source language and b) a target language to which translation from the source language is requested, determine, using data from the data repository, that one or more second users of the pre-determined user group is associated with the source language and associated with the target language, each of the second users being a candidate to perform a translation from the source language to the target language, and cause an identification of the one or more second users, each of whom is a candidate to perform a translation from the source language to the target language, to be transmitted to the user device for display on the user interface;

wherein the display of the identification of the one or more second users is based on a permission that allows a corresponding second user to be identified to one or more other users in the pre-determined user group.

17. The system of claim 16, wherein the analysis engine is configured to verify the association of the first user with the pre-determined user group.

18. The system of claim 16, wherein the language capabilities of the users within the pre-determined user group are determined based on:
identifying a particular language from the electronic documents of the corpus;
identifying one or more users associated with the electronic documents; and
storing the particular language as a language capability of the identified one or more users.

19. The system of claim 18, wherein at least some of the users associated with the electronic documents are each either a sender or a recipient of a threshold number of the electronic documents.

20. The system of claim 18, wherein identifying the particular language from the electronic documents comprises analyzing an attachment associated with at least one of the electronic documents.

21. The system of claim 18, wherein the analysis engine is configured to determine that the electronic documents include a threshold quantity of text written by the identified one or more users.

22. The system of claim 16, wherein the permission is provided by the corresponding second user.

23. The system of claim 16, wherein the analysis engine is configured to provide the user interface on the display of the user device in response to receiving an indication that a translation task is to be performed.

24. The system of claim 16, wherein the electronic documents comprise one or more of emails and documents attached to emails.

25. A system comprising:
a database that stores abilities of users associated with one or more documents; and an analysis engine comprising a processor, the analysis engine configured to:
based on information in the documents, automatically infer the abilities of the users associated with the documents, to perform language translations, the abilities including language capabilities and non-language capabilities, maintain the abilities of the respective users in the database, receive an indication of a language translation to be performed for a user, and in response to the indication of the language translation to be performed for the user, query the database to identify one or more candidate users to perform the language translation, wherein the database is configured to determine the one or more candidate users to perform the language translation using the language capabilities and non-language capabilities of the one or more candidate users.

26. The system of claim 25, wherein the documents include emails or attachments of emails, or both.

27. The system of claim 25, wherein automatically inferring language capabilities and non-language capabilities of users associated with the documents comprises automatically inferring, for each of the users, a proficiency in an academic discipline.

28. The system of claim 25, wherein automatically inferring language capabilities and non-language capabilities of users associated with the documents comprises automatically inferring, for each of the users, a proficiency in a technical skill.

29. The system of claim 25, wherein:
receiving the indication of the language translation to be performed for the user comprises receiving the indication of the language translation to be performed for the user and a particular non-language capability; and
determining the one or more candidate users to perform the language translation using the language capabilities and non-language capabilities of the one or more candidate users comprises determining the one or more candidate users to perform the language translation who each have the particular non-language capability.

30. The system of claim 25, wherein:
receiving the indication of the language translation to be performed for the user comprises receiving the indication of the language translation to be performed for the user and a technical skill required for the language translation; and
determining the one or more candidate users to perform the language translation using the language capabilities and non-language capabilities of the one or more candidate users comprises determining the one or more candidate users to perform the language translation using the technical skills of the one or more candidate users.

31. A non-transitory computer readable storage device storing a computer program product comprising machine-readable instructions that, when executed, cause a computer system to carry out operations comprising:
receiving, by the computer system, data entered at a user interface provided on a display of a user device from a first user associated with a pre-determined user group, the data comprising an identification of a) a source language and b) a target language to which translation from the source language is requested;
determining, by the computer system, that one or more second users of the pre-determined user group is associated with the source language and associated with the target language, each of the second users being a candidate to perform a translation from the source language to the target language, based on accessing a data repository that stores language capabilities of users within the pre-determined user group, the language capabilities of the users within the pre-determined user group being determined automatically based on mining a corpus of electronic documents associated with the pre-determined user group; and
transmitting, by the computer system, an identification of the one or more second users, each of whom is a candidate to perform a translation from the source language to the target language, to the user device for display on the user interface;
wherein the display of the identification of the one or more second users is based on a permission that allows a corresponding second user to be identified to one or more other users in the pre-determined user group.

32. The computer readable storage device of claim 31, the operations comprising verifying that the user device is associated with a user of the pre-determined user group.

33. The computer readable storage device of claim 31, wherein the language capabilities of the users within the pre-determined user group are determined based on:
identifying a particular language from the electronic documents of the corpus;
identifying one or more users associated with the electronic documents; and
storing the particular language as a language capability of the identified one or more users.

34. The computer readable storage device of claim 33, wherein at least some of the one or more users associated with the electronic documents are each either a sender or a recipient of a threshold number of the electronic documents.

35. The computer readable storage device of claim 33, wherein identifying the particular language from the electronic documents comprises analyzing an attachment associated with at least one of the electronic documents.

36. The computer readable storage device of claim 33, the operations comprising determining that the electronic documents include a threshold quantity of text written by the identified one or more users.

37. The computer readable storage device of claim 31, wherein the permission is provided by the corresponding second user.

38. The computer readable storage device of claim 31, the operations comprising:
providing the user interface on the display of the user device in response to receiving an indication that a translation task is to be performed.

39. The computer readable storage device of claim 31, wherein the electronic documents comprise one or more of emails and documents attached to emails.

40. A non-transitory computer readable storage device storing a computer program product comprising machine-readable instructions that, when executed, cause a computer system to carry out operations comprising:
based on information in one or more documents, automatically inferring, by the computer system, abilities of users associated with the documents, to perform language translations, the abilities including language capabilities and non-language capabilities;
maintaining, by the computer system, a database of the abilities of the respective users;
receiving, by the computer system, an indication of a language translation to be performed for a user;
in response to the indication of the language translation to be performed for the user, querying, by the computer system, the database to identify one or more candidate users to perform the language translation; and
determining, by the computer system, the one or more candidate users to perform the language translation using the language capabilities and non-language capabilities of the one or more candidate users.

41. The computer readable storage device of claim 40, wherein the documents include emails or attachments of emails or both.

42. The computer readable storage device of claim 40, wherein automatically inferring language capabilities and non-language capabilities of users associated with the documents comprises automatically inferring, for each of the users, a proficiency in an academic discipline.

43. The computer readable storage device of claim 40, wherein automatically inferring language capabilities and non-language capabilities of users associated with the documents comprises automatically inferring, for each of the users, a proficiency in a technical skill.

44. The computer readable storage device of claim 40, wherein:
  receiving, by the computer system, the indication of the language translation to be performed for the user comprises receiving the indication of the language translation to be performed for the user and a particular non-language capability; and
  determining, by the computer system, the one or more candidate users to perform the language translation using the language capabilities and non-language capabilities of the one or more candidate users comprises determining the one or more candidate users to perform the language translation who each have the particular non-language capability.

45. The computer readable storage device of claim 40, wherein:
  receiving, by the computer system, the indication of the language translation to be performed for the user comprises receiving the indication of the language translation to be performed for the user and a technical skill required for the language translation; and
  determining, by the computer system, the one or more candidate users to perform the language translation using the language capabilities and non-language capabilities of the one or more candidate users comprises determining the one or more candidate users to perform the language translation using the technical skills of the one or more candidate users.

* * * * *